United States Patent [19]

Fenchel et al.

[11] Patent Number: 5,261,378
[45] Date of Patent: Nov. 16, 1993

[54] DEVICE FOR PRODUCING A DESIRED VALUE OF A CONTROL PARAMETER OF AN INTERNAL COMBUSTION ENGINE

[75] Inventors: Reinhard Fenchel, Calw-Altburg; Hermann Kull, Stuttgart; Dieter Seher, Ilsfeld; Gerhard Engel, Stuttgart; Manfred Birk, Oberriexingen, all of Fed. Rep. of Germany

[73] Assignee: Robert Bosch GmbH, Stuttgart, Fed. Rep. of Germany

[21] Appl. No.: 971,711
[22] PCT Filed: Aug. 3, 1989
[86] PCT No.: PCT/EP89/00925
  § 371 Date: May 13, 1991
  § 102(e) Date: May 13, 1991
[87] PCT Pub. No.: WO91/02148
  PCT Pub. Date: Feb. 21, 1991

Related U.S. Application Data

[63] Continuation of Ser. No. 671,769, May 13, 1991, abandoned.

[51] Int. Cl.$^5$ .................................. F02M 37/04
[52] U.S. Cl. ........................... 123/501; 123/357
[58] Field of Search ............ 123/501, 500, 479, 357, 123/358, 359, 179.17, 198 D

[56] References Cited

U.S. PATENT DOCUMENTS

| | | | |
|---|---|---|---|
| 4,265,200 | 5/1981 | Wessel | 123/501 |
| 4,541,380 | 9/1985 | Oshizawa | 123/357 |
| 4,596,221 | 6/1986 | Ament | 123/501 |
| 4,617,902 | 10/1986 | Hirano | 123/479 |
| 4,638,782 | 1/1987 | Yasuhara | 123/479 |
| 4,643,154 | 2/1987 | Matsuno | 123/501 |
| 4,677,560 | 6/1987 | Cao | 123/357 |
| 4,711,211 | 12/1987 | Oshizawa | 123/501 |
| 4,730,586 | 3/1988 | Yamaguchi | 123/501 |
| 4,791,904 | 12/1988 | Grieshaber | 123/479 |
| 4,793,308 | 12/1988 | Brauninger | 123/479 |

FOREIGN PATENT DOCUMENTS 0059586 8/1982 European Pat. Off. ............ 123/501
3540813 5/1987 Fed. Rep. of Germany .

Primary Examiner—Carl S. Miller
Attorney, Agent, or Firm—Kenyon & Kenyon

[57] ABSTRACT

In a device for adjusting the injection timing in a diesel engine fitted with EDC, a basic value (SBGWs) of injection timing for operation in the static or steady state is stored in a first characteristic field (20) and a basic value (SBGWd) for operation in the dynamic or unsteady state such as acceleration and deceleration is stored in a second characteristic field (22). These basic values are dependent on desired injected fuel quantity (Q) and engine speed (n). The characteristic field (20) for the static state is designed empirically or otherwise to optimize fuel consumption whereas the characteristic field (22) for the dynamic state is designed for minimum pollutant emission. A gradual changeover from one mode to the other is achieved by the gradual change of a multiplying factor (c) from 0 to 1 or vice versa responsively to dQ/dt departing significantly from zero or becoming zero.

10 Claims, 6 Drawing Sheets

DEVICE FOR PRODUCING A DESIRED VALUE OF A CONTROL PARAMETER OF AN INTERNAL COMBUSTION ENGINE

This is a continuation of application Ser. No. 07/671,769, filed May 13, 1991, entitled DEVICE FOR PRODUCING A DESIRED VALUE OF A CONTROL PARAMETER OF AN INTERNAL COMBUSTION ENGINE, now abandoned

TECHNICAL FIELD

The invention relates to a device for producing a desired value for an engine control parameter of an internal combustion engine equipped with an electronic control.

INVENTION

A device concerned with the injective timing of a diesel engine that has an electronic diesel control ("EDC") is discussed in German Application No. DE-A-3540813. Particularly, it is concerned with the adjustment of the injection timing of a diesel engine equipped with EDC. The purpose of the device described in this document is to retard the fuel injection in the event of a rapid increase of power and to avoid or mitigate the temporary increase in engine noise which would otherwise take place. The injection retardation is fixed in terms of crankshaft angle and is sudden, although the subsequent advance is gradual and its onset is delayed. This device cannot retard the injection timing in the event of a sudden decrease in engine power and such a facility is in any case not needed for the purpose of reducing engine noise.

It is known also to adjust the injection timing in a diesel engine to achieve optimum fuel consumption, and to minimize emission of pollutants in the exhaust gas. It is further known with EDC to store a characteristic field of the desired injection timing in relation to one or more engine operating parameters, such as desired injected fuel quantity and engine speed.

When an engine is running in the steady state, i.e. when running at a substantially constant speed and load, the pollutant emission with the engine adjusted for optimum fuel consumption may still be within prescribed European standards although not the minimum obtainable in the steady state. Also, steady state running is usually only possible when driving outside towns, where pollutant emission is less critical. However, there is a likelihood of there being excessive or objectionable pollutant emission when increasing or decreasing the engine load (injected fuel quantity) with the injection timing adjusted for optimum fuel consumption.

SUMMARY OF THE INVENTION

The present invention is for obtaining optimum fuel consumption in steady state engine operation and acceptably low pollution emission when the engine is accelerating and decelerating.

The device according to the present invention stores characteristic fields of basic injection timing values for optimum fuel consumption and for minimum pollutant emission respectively.

According to the present invention, to minimize the risk of any jerkiness in operation, it is preferably that the changeover from either the static or dynamic mode to the other to be gradual.

The present invention includes command signal for triggering changeover between the static and dynamic modes and is useful for preventing too-frequent changes from one mode to the other.

Further, the present invention compensates for changes in cooling water temperature and compensates for changes in barometric pressure (altitude).

In the past, the desired value ($SB_{des}$) is compared with a measured or actual value ($SB_{act}$) in a closed servo-loop which contains a PI controller for operating the servo itself. In the case of a four-stroke multi-cylinder engine, the actual value ($SB_{act}$) of the control parameter (SB), such as the injection timing, can only be measured once for every two engine revolutions. The PI controller, therefore, must be designed for a slow response time, particularly to prevent hunting or overshoot when the engine is idling.

To avoid the problem that there is no measured actual value ($SB_{act}$) available during engine starting and when the vehicle is overrunning the engine, e.g. when going downhill, it is extremely advantageous to provide for open-loop "anticipatory" control as in the present invention. The anticipatory control, in the case of injection timing, can include timing maps for static and dynamic modes, with a separate timing map for engine starting being used.

The present invention is hereinafter particularly described in relation to the injection timing in the case of a diesel engine, however, it is applicable to other engine control parameters, particularly those which affect pollutant emission, such as injected fuel quantity, or, in the case of a petrol engine, the ignition timing or the fuel/air ratio.

DETAILED DESCRIPTION OF THE DRAWINGS

Figure 1:
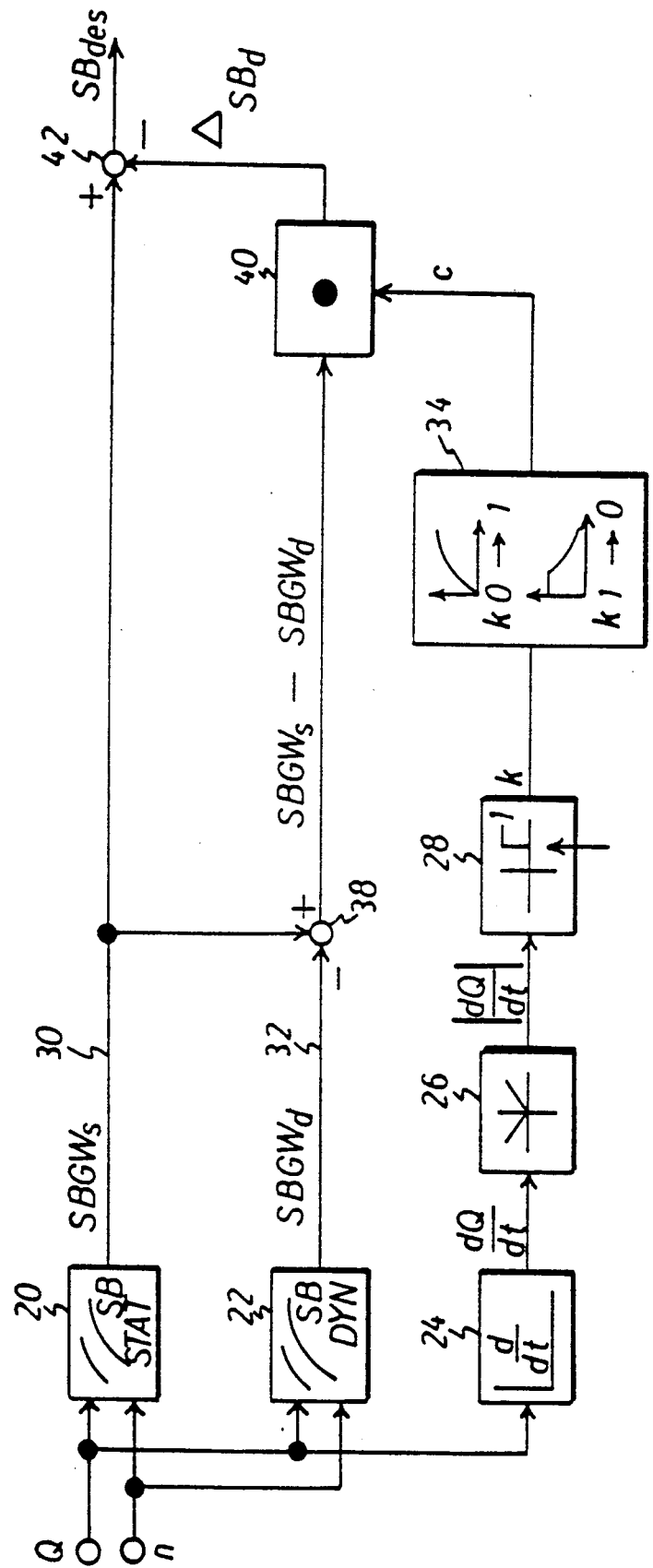
FIG. 1 is a block circuit diagram of one embodiment of the device of the present invention for producing a basic desired value for the adjustment of the injection timing of a diesel engine.

A device for adjusting the injection timing (at the beginnig of fuel injection) in a diesel engine includes a device for producing a desired value ($SB_{des}$) of the injection timing angle, as shown in FIG. 1. Parallel branches (30,32) comprise appropriate memory zones (20,22) of an electronic diesel control (EDC). The characteristic field in zone 20 stores basic values SBGWs of the injection timing for the steady state or static running mode of the engine for various values of engine power, as represented by the injected fuel quantity Q, and the engine speed n. In other words, for the static mode in which the injected fuel quantity is hardly varying $$\left(\frac{dQ}{dt}=0\right),$$

the zone 20 for the static mode characteristic field or timing map for the steady state delivers an appropriate basic value SBGWs determined empirically to adjust the injection timing for maximum fuel economy, in accordance with the prevailing injected fuel quantity Q and engine speed n. Similarly for the dynamic running mode in which the injected fuel quantity Q is rising or falling significantly $$\left(\frac{dQ}{dt}>>0 \text{ or } \frac{dQ}{dt}<<0\right),$$

the zone 22 for the dynamic mode characteristic field or timing map for the transient state delivers an appropriate basic value SBGWd determined empirically to adjust the injection timing for minimum pollutant content of the exhaust gases of the engine.

The static mode basic timing value SBGWs is fed by the branch 30 to an adding input of a subtractor 42 whose output is the desired value $SB_{des}$ of the injection timing. The branch 32 contains a subtractor 38 and a multiplier 40. The static and dynamic mode basic values SBGWs and SBGWd are applied respectively to adding and subtracting inputs of the subtractor 38 which feeds the difference SBGWs−SBGWd to the multiplier 40. This difference is multiplied by an adjusting factor c to produce an adjustment value ΔSBd for the non-steady state or dynamic mode and the adjustment value is fed to the subtracting input of the subtractor 42.

To obtain an adjustment trigger signal k which indicates which of the basic values SBGWs and SBGWd should be used to determine the injection timing, the injected fuel quantity Q is differentiated in a differentiator 24, the output $$\frac{dQ}{dt}$$

of the latter is passed to a magnitude former 26 which produces the magnitude $$\left|\frac{dQ}{dt}\right| \text{ of } \frac{dQ}{dt}$$

and this magnitude is fed to a comparator 28 at whose output appears the adjusting trigger signal k. This signal k=0 when $$\frac{dQ}{dt} \approx 0$$

but when the rate of change in the injected fuel quantity becomes significant, the magnitude $$\left|\frac{dQ}{dt}\right|$$

exceeds the low threshold of the comparator 28 whereby k=1.

The adjusting trigger signal k could be fed directly to the multiplier 40 as the adjusting factor c. Thus, when c=0, ΔSBd=0 and $SB_{des}$=SBGWs. When c=1, ΔSBd=SBGWs−SBGWd, whereby $SB_{des}$=SBGWd. However, to avoid a sudden change in $SB_{des}$ when changing from the static to the dynamic mode and vice versa, the factor c when changed, changes smoothly from one value to another. Furthermore, when k changes from 1 to 0, the factor c only commences to change from 1 to 0 after a delay time t. This prevents short term switching from the dynamic mode to the static mode. A calculating circuit 34 is provided for producing the factor c.

Figure 2:
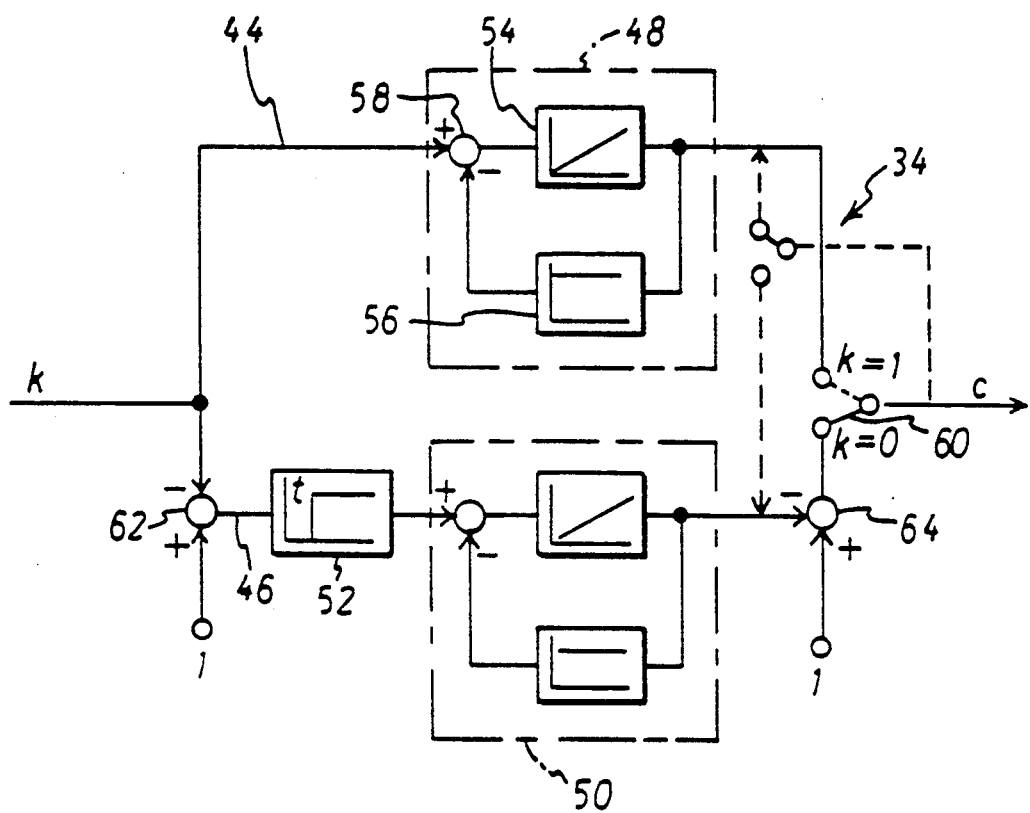
FIG. 2 is a detailed diagram of the calculating circuit of the device of FIG. 1.

The calculating circuit 34 is shown somewhat more fully in FIG. 2. It comprises two branches 44, 46, each containing a function circuit 48, 50 having a delaying function. In addition, the branch 46 contains a delay timer 52 for producing the delay time t. Each function circuit 48, 50 contains an integrator 54 and a proportional device 56 connected between the output side of the integrator 54 and the subtracting input of a subtractor 58 at the input side of the integrator 54. The output of each function circuit 48,50 thereby rises exponentially from 0 to 1 when its input is suddenly raised from 0 to 1.

The signal k is applied directly to the positive input of the subtractor 58 in the branch 44, which is effective when k changes from 0 to 1. The output of the function circuit 48 in the branch 44 is connected to one pole of an electronic changeover switch 60 at whose output the factor c appears. The electronic switch 60 is changed over from its position shown in full lines to its position shown in dotted lines when the signal k changes from 0 to 1 and vice versa.

The branch 46 is shown as containing inverters 62,64 in the form of subtractors to whose adding inputs 1's are applied. When the signal k changes from 1 to 0, the timer 52 is triggered and, after the delay t, its output changes from 0 to 1. When this happens, the output of the function circuit 50 changes exponentially from 0 to 1 whereby the output of the inverter 64, which is connected to the second pole of the electronic changeover switch 60 falls exponentially from 1 to 0.

It may happen that the signal k changes again from 0 to 1 before the factor c has reached the value 0 following a previous change in k from 1 to 0. To avoid a sudden jump in the value of the factor c when the switch 60 changes over, it must be ensured that the value on the output of the function circuit 48 is equal to the value of the factor c immediately before changeover of the switch 60. Therefore, when the signal k changes from 0 to 1, the actual value of c appearing at the output of the switch 60 immediately before changeover of the switch 60 is stored at the output side of the delay circuit 48, as indicated diagrammatically by dotted lines. Similarly, when the signal k changes from 1 to 0, the actual value of c appearing at the output of the switch 60 immediately before changeover of the switch is stored at the output side of the delay circuit 50. It is thereby ensured that there is no sudden change in the value of the factor c when the switch 60 changes over, even should the value of c lie between 0 and 1 immediately before the changeover takes place.

In FIG. 1, $SB_{des}$=(1−c).SBGWs+c.SBGWd. Therefore, when the engine power, as represented by the injected fuel quantity Q, is increased or decreased significantly, the factor k changes from 0 to 1 but the desired injection timing $SB_{des}$ changes over exponentially from the basic static value SBGWs for good fuel economy to the basic dynamic value SBGWd for low exhaust emission. When the engine power is no longer increasing or decreasing significantly, the signal k changes from 1 to 0 but the desired timing $SB_{des}$ changes exponentially, but only after elapse of the timer delay t, from the dynamic value SBGWd to the static value SBGWs. The delay t in returning to the static mode helps to ensure that, in towns, the engine is for the most part operating in its mode for minimum exhaust emission when the driver will have need to accelerate and decelerate frequently. Out of towns, where exhaust emission is not so critical, the engine can run in its most economical mode, since the driver will be driving at a substantially constant speed.

Figure 3:
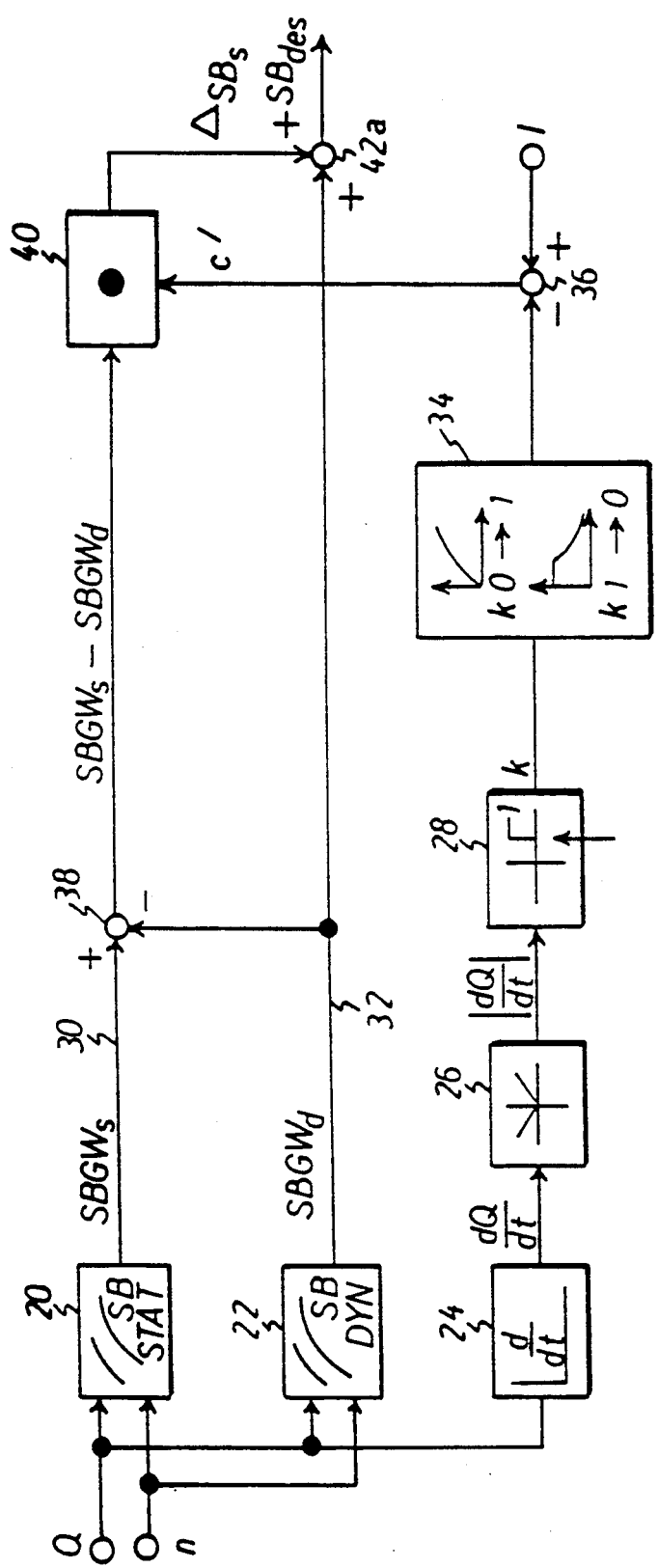
FIG. 3 is a second embodiment of the circuit diagram shown in FIG. 1.

In FIG. 3 parts like those of FIG. 1 are denoted by like reference numerals. FIG. 3 differs from FIG. 1 in the SBGWd is fed to an adder 42a at whose output appears the desired value $SB_{des}$ of the injection timing. The subtractor 38 and the multiplier 40 are, in this embodiment, arranged in the branch 30 containing the store 20 for the static mode timing map. The multiplier 40 is arranged between the output of the subtractor 38 and the second adding input of the adder 42a. The output of the calculating circuit 34 is fed to an inverter shown in the form of a subtractor 36 to whose adding input a 1 is applied. The adjusting factor c' appears at the output of the subtractor 36 and is fed to the multiplier 40. It is thereby achieved that the adjusting factor c' falls gradually from 1 to 0 after the signal k changes from 0 to 1 and vice versa. In FIG. 3 SBs=c' (SBGWd−SBGWd) so that $SB_{des}$=SBGWs in the static mode and $SB_{des}$=SBGWd in the dynamic mode, as in the first embodiment and the change from one mode to the other is gradual, with a delay being introduced when changing back from the dynamic mode to the static mode.

Figure 4:
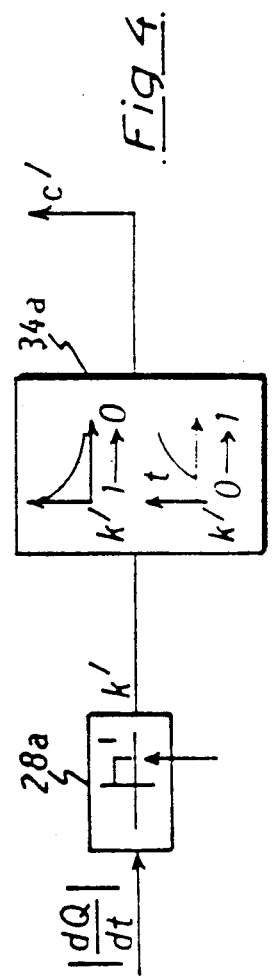
FIG. 4 is a circuit diagram of a modified version of the second embodiment of the calculating circuit for providing an adjusting factor.

FIG. 4 indicates a modification to the calculating circuit 34a wherein the factor c' falls exponentially from 1 to 0 when the output k' of the comparator 28a changes from 1 to 0 and the factor c', after a delay t, rises exponentially from 0 to 1 when the output k' of the comparator 28a changes from 0 to 1 The comparator 28a changes its output k' from 1 to 0 as soon as $$\left| \frac{dQ}{dt} \right|$$

exceeds the relatively low threshold. The adjusting factor c' is thus obtained directly from the output of the calculating circuit 34a and the subtractor 36 with the 1 input is omitted.

Figure 5:
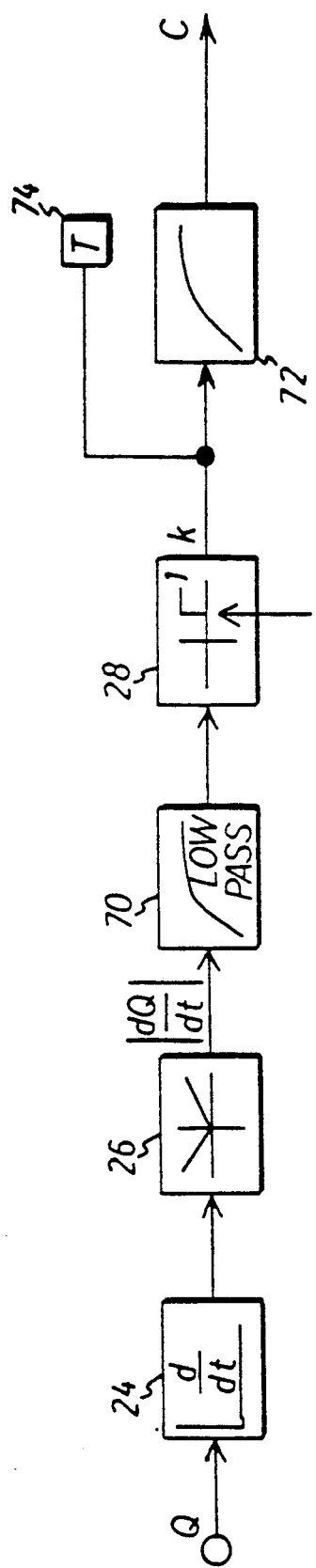
FIG. 5 is a circuit diagram of a further embodiment of the calculating circuit for providing an adjusting factor.

FIG. 5 shows an embodiment in which a low pass filter 70 is arranged between the magnitude former 26 and the comparator 28. The response of the comparator to a rapidly increasing $$\left| \frac{dQ}{dt} \right|$$

is thereby delayed. This prevents momentary actuations of the accelerator pedal from effecting a changeover from one characteristic field to the other. The low pass filter 72 and delay 74 of the calculating circuit are shown diagrammatically.

An advantage of the circuits thus far described is that the lowest possible fuel consumption is obtained during steady cruising, yet emission regulations can be complied with during transient changes in the driving conditions (operation of the accelerator pedal to increase or decrease vehicle velocity and/or change gear).

Figure 6:
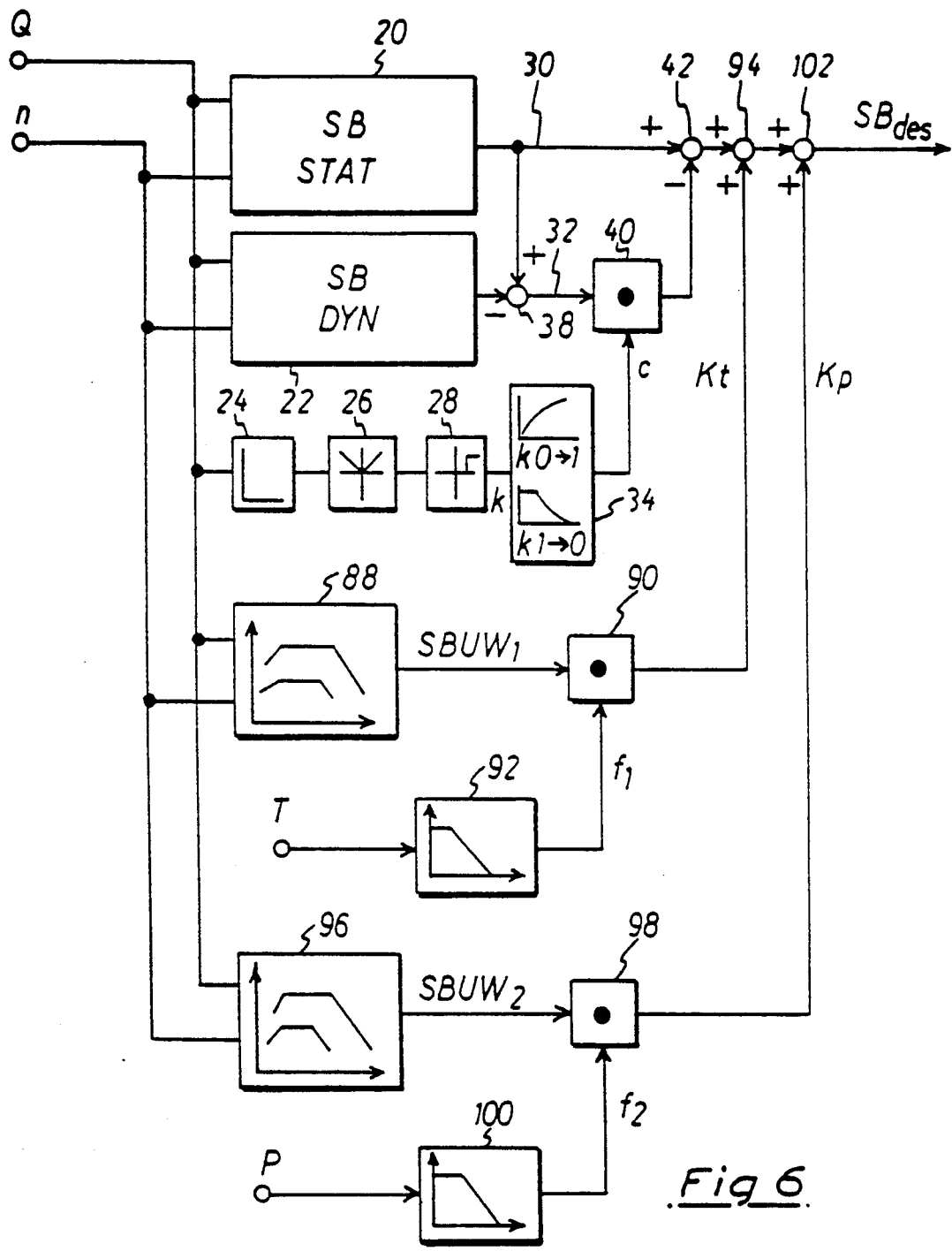
FIG. 6 is a second embodiment of the present invention that also corrects for water temperature and atmospheric pressure.

FIG. 6 shows an adaptation of the circuit of FIG. 1 to enable the injection timing to be corrected for water temperature T and for atmospheric air pressure P or altitude. The components 20 to 22 of FIG. 1 are again shown in FIG. 6. The timing maps in the stores 20 and 22 are those appropriate to the temperature of the cooling water when the engine has warmed up and to the normal atmospheric pressure when the vehicle is at or close to sea level.

A basic injection advance correction SBUW1 to the static basic value SBGWs for a temperature difference $T_h - T_c$ between the normal running temperature $T_h$ and the usual cold temperature $T_c$ (i.e. the temperature when the vehicle has been left standing for a considerable time) is obtained from a stored characteristic field or map 88 in dependence on injected fuel quantity Q and engine speed in. This is then multiplied by a temperature dependent factor $f_1$ in a multiplier 90. The temperature factor $f_1$ is obtained from a stored characteristic curve 92 in dependence on the actual water temperature T. For $T=T_c$, $f_1=1$. The actual correction $Kt=f_1 \times SBUW1$ supplied to an adder 94 inserted beyond the multiplier 42, whereby the fuel injection is advanced when the engine is cold, to take account the delayed onset of combustion. In very cold conditions $T<T_c$ and the factor $f_1>1$.

To compensate for altitude, a correction SBUW2 for a nominal or basic altitude as measured by a barometric pressure $P_h$ as compared with standard atmospheric pressure $P_o$, is obtained from a stored characteristic field or map 96 in dependence on Q and n. SBUW2 is then multiplied in a multiplier 98 by a factor $f_2$ dependent on the actual altitude or atmospheric pressure. The altitude factor $f_2$ is obtained from a logic or stored characteristic curve 100 such that $$f_2 = \frac{P_o - P}{P_o - P_h}.$$

The injection advance to compensate for the increased ignition delay experienced at altitude is then achieved by supplying a correction $Kp = F_2 \times SBUW2$ to an adder 102 beyond the adder 94.

The desired injection timing $SB_{des}$ appears at the output of the adder 102. It is used to control the injection timing as illustrated in FIG. 7.

Figure 7:
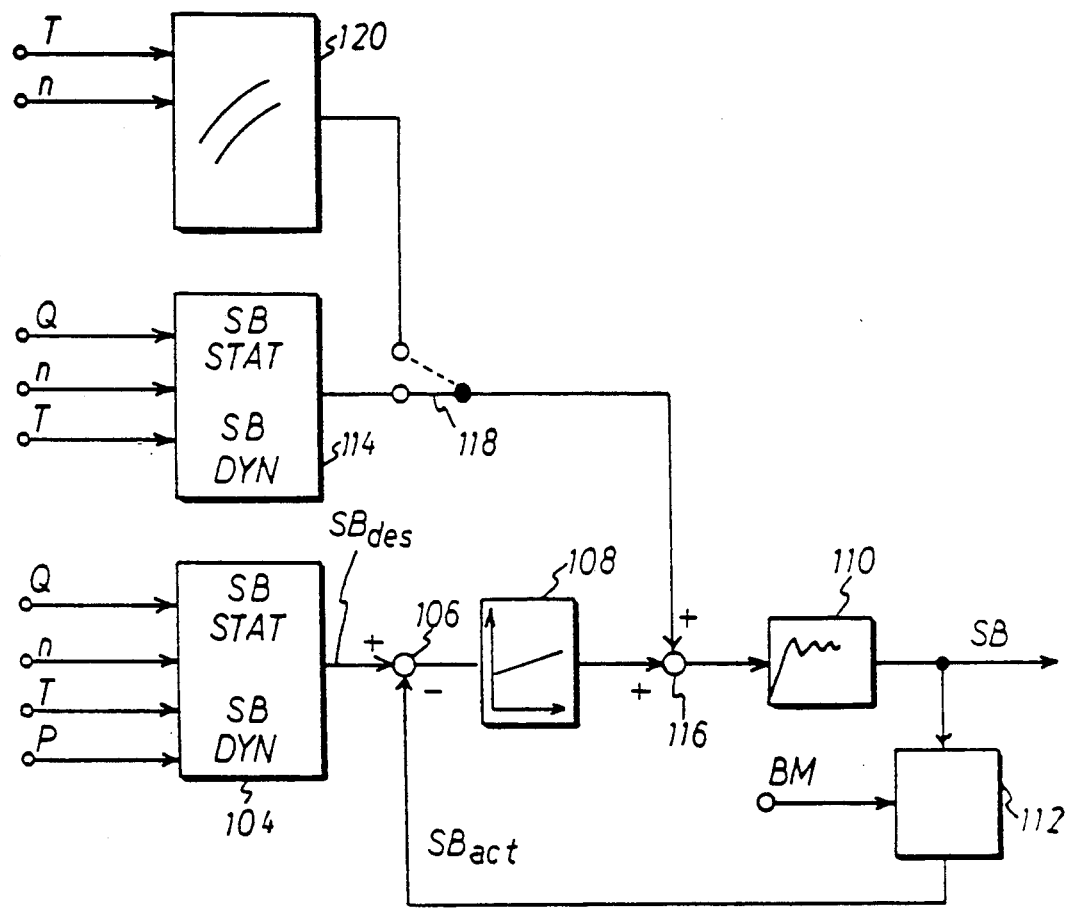
FIG. 7 is a block diagram of a device for adjusting the timing of fuel injection in a diesel engine.

In FIG. 7, the circuit of FIG. 6 is denoted as desired value former 104. It is responsive to engine power (injected fuel quantity Q), engine speed n, water temperature T and barometric pressure p. The desired value $SB_{des}$ of the timing angle is fed to a servo loop which includes a comparator 106, a controller 108, a timing servo 110 and an actual value transducer 112. The comparator 106 is shown as a subtractor which subtracts the actual injection timing value $SB_{act}$ from the desired value $SB_{des}$ and delivers the resulting error signal $\Delta SB - SB_{des} - SB_{act}$ to the controller 108. The latter is a PI controller and its output operates the servo 110. The servo 110 is an electro-fluid device or a solenoid device with a mechanical output by which the timing angle of the fuel injection pump is physically adjusted.

Because there are phenomena which affect the actual onset of fuel injection as compared with that set at the fuel injection pump, the actual value $SP_{act}$ of the fuel injection timing SB is measured at one of the fuel injection nozzles by means of the actual value transducer 112 which senses lifting of the valve needle in the injection nozzle and measures the crankshaft angle between the valve lifting and a reference mark BM on the crankshaft. The reference mark BM is a signal delivered each time the engine crankshaft passes through a predetermined angular position. The servo loop containing the PI controller 108 is thereby enabled to compensate for slow changes or long-term errors due to the effect of fuel temperature on the compressibility of the fuel which affects the nozzle opening pressure.

Because the transducer 112 can only deliver an actual value $SB_{act}$ once for every two revolutions of the crankshaft (for a four-stroke engine), there is a particularly long delay between effecting an adjustment of the timing angle and receiving a feedback signal responsive to the adjustment when the engine is running slowly (idling). The PI controller 108 must therefore be designed to give a slow response to avoid hunting. When starting the engine or when the vehicle is overrunning the engine (using the engine as a retarder or brake), there is no fuel injection and accordingly the transducer 112 cannot deliver an actual value $SB_{act}$. Therefore the PI controller 108 cannot deliver an output to adjust the servo 110 until fuel injection commences. Because of the slow response, there is a long delay, possibly up to 1 sec, between the first delivery of fuel to the engine cylinders and the appropriate adjustment of the injection timing to the desired value $SB_{des}$. It is therefore advisable to provide an open-loop servo system or by-pass which can adjust the injection timing to a suitable value in advance of any fuel injection actually taking place. This may be called a "pre-control" or "anticipatory control".

The anticipatory control comprises a desired value former 114 which may be constructed in the same way as the desired value former 104 shown in FIG. 6. Thus, it also may contain two timing maps respectively for static and dynamic modes and it may have provision for correction for changes in engine temperature. However, compensation for barometric pressure (altitude) can be omitted, since the effect of barometric pressure changes is relatively small and can be compensated for when the closed loop takes over. The output of the desired value former 114 is fed to an adder 116 arranged in the closed servo loop between the PI controller 108 and the servo 110. The anticipatory control thereby adjusts the injection timing to a suitable value in the absence of any output from the PI controller 108.

When starting the engine, special conditions arise, particularly when the engine is cold and the desired value supplied by the desired value former 114 may not be appropriate. Therefore, for starting purposes, the anticipatory control includes a starting timing map 120. On starting, an electronic switch 118 is changed over to connect the timing map 120 to the adder 116 instead of the desired value former 114. The timing map 120 produces a desired value of the injection timing dependant only on engine temperature (coolant temperature) and engine speed and the servo 110 adjusts the injection timing accordingly. As soon as the engine has started, e.g. as soon as the starting speed or a slow idling speed has been reached, the switch 118 changes over to its position shown in full lines. In the meantime, the closed servo-loop has become effective to control the injection timing.

We claim:

1. A device for producing a desired value ($SB_{des}$) of an engine control parameter (SB) of an internal combustion engine which is equipped with electronic control, comprising:
   a static branch and a dynamic branch (30,32), with each branch further including a store in which a characteristic field (20,22) is stored pertaining to a different basic value ($SBGW_s$, $SBGW_d$) for respective static and dynamic operating modes of the engine in accordance with at least one engine operating parameter (Q, n), with at least one of the branches (30 or 32) further including an arithmetic device for changing over from either the static or dynamic operating mode to the other, with the rate of changeover from the static mode to the dynamic mode or vice versa being gradual through the production of at least one intermediate characteristic field value such that abrupt changes in the desired value $SB_{des}$ are prevented.

2. The device according to claim 1, wherein a first stored characteristic field (20) provides basic timing values ($SBGW_s$) for optimum fuel consumption for a static mode in which the engine power (Q) is constant or varies below a predetermined amount, and a second stored characteristic field (22) provides basic timing values ($SBGW_d$) for minimum exhaust gas pollution for a dynamic mode in which the engine power (Q) changes above a predetermined amount.

3. The device according to claim 2, wherein the device further includes
   means (24) for determining a magnitude of the rate of change (dQ/dt) of power, and
   a comparator (28) responsive to the magnitude of the rate of change (dQ/dt) of power which is greater than a predetermined minimum for changing over from the static mode to the dynamic mode or vice versa.

4. The device according to claim 3, wherein a low pass filter (70) arranged at the input of the comparator (28) prevents the comparator from responding to short duration changes in engine power.

5. The device according to claim 4, wherein the device further includes means to make temperature corrections (Kt) to the static mode value ($SBGW_s$) and the dynamic mode value ($SBGW_d$) in deriving the desired value ($SB_{des}$).

6. The device according to claim 4, wherein the device further includes means to make altitude corrections (Kp) to the static mode value ($SBGW_s$) or the dynamic mode value ($SBGW_d$) in deriving the desired value ($SB_{des}$).

7. The device according to claim 6, wherein an anticipatory control or by-pass (114) operable by means of an open loop provides the engine control parameter (SB) when no feedback signal or actual value ($SB_{act}$) is available for comparison with the desired value ($SB_{des}$) in a closed servo-loop, with the servo-loop including a controller (108) for controlling an output servo (110) which adjusts the control parameter (SB).

8. The device according to claim 7, wherein the anticipatory controller (114) includes,
   a static and dynamic branch, with each branch further including a characteristic field,
   means for determining the magnitude of the rate of change (dQ/dt) of power, and
   a comparator responsive to the magnitude of the rate of change (dQ/dt) of power.

9. The device according to claim 7, wherein the anticipatory control further includes a separate characteristic field for producing a desired value of the engine control parameter (SB) in response to at least one engine operating parameter for starting purposes.

10. The device according to claim 1, wherein the gradual changeover includes an exponential changeover.

* * * * *

UNITED STATES PATENT AND TRADEMARK OFFICE
CERTIFICATE OF CORRECTION

PATENT NO. : 5,261,378
DATED : November 16, 1993
INVENTOR(S) : Fenchel et al.

It is certified that error appears in the above-indentified patent and that said Letters Patent is hereby corrected as shown below:

Column 1, line 17, change "INVENTION" to --BACKGROUND OF THE INVENTION--;

Column 6, line 20, change "in." to --n.--.

Signed and Sealed this

Twenty-first Day of February, 1995

Attest:

BRUCE LEHMAN

*Attesting Officer*     *Commissioner of Patents and Trademarks*